United States Patent Office 3,052,798
Patented Sept. 4, 1962

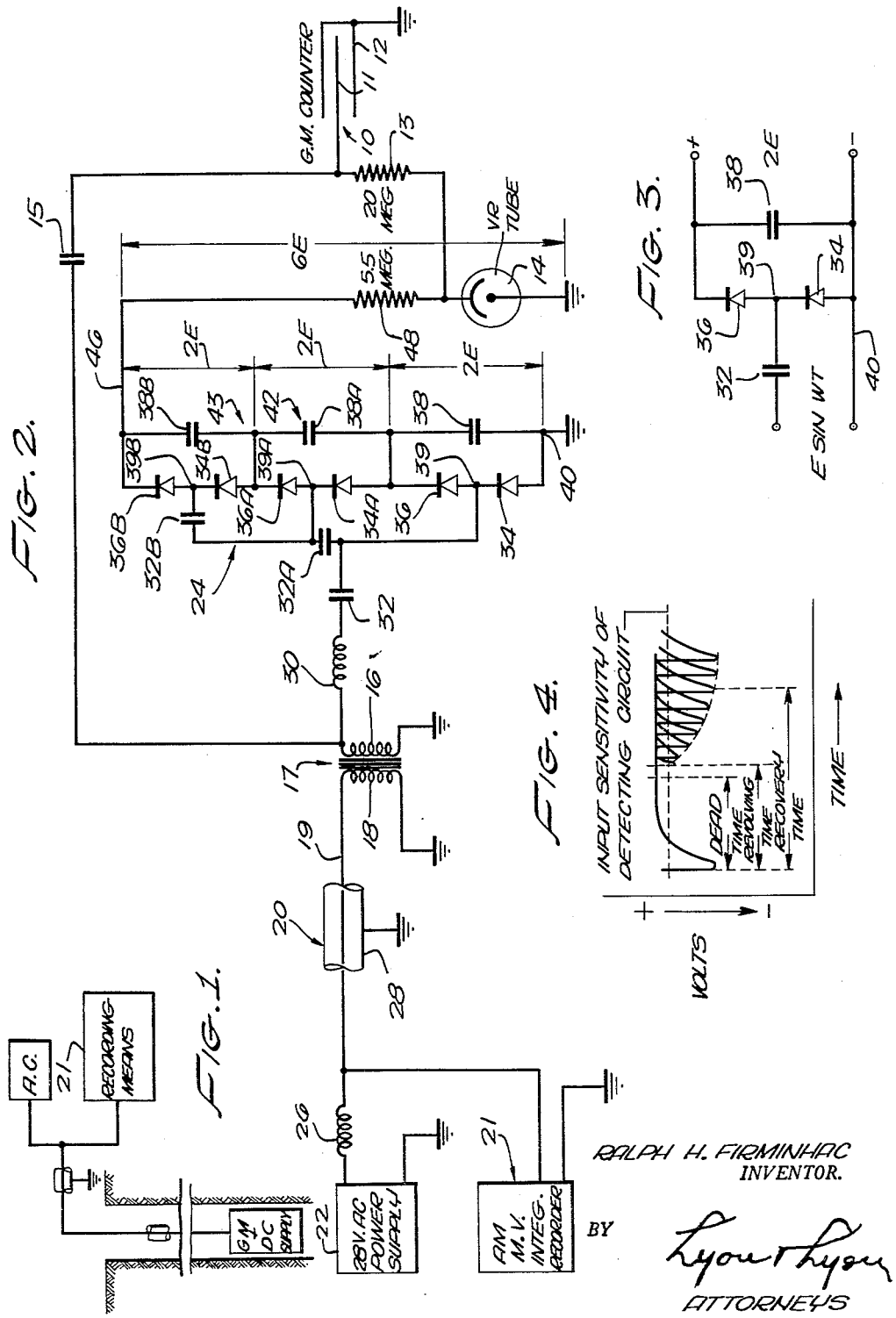

1

3,052,798
POWER SUPPLY FOR IONIZATION DEVICES
IN WELL BORES
Ralph H. Firminhac, Kent, Wash., assignor to Halliburton Company, a corporation of Delaware
Filed Mar. 31, 1959, Ser. No. 803,163
8 Claims. (Cl. 250—83.6)

The present invention relates to the detection and/or recording of natural or induced radioactivity in well bores and particularly to means and techniques whereby an ionization device such as, for example, a pulse type proportional counter or Geiger-Müller (G.M.) Counter is energized from a D.C. source located in the well bore and a single conductor extending into the well bore serves to conduct both the current required for the D.C. source as well as the pulses developed by the ionization device.

A G.M. counter comprising generally a gas-filled cylinder surrounding a central wire with a voltage applied between the same is a well-known device and is considered to be an ion-magnifying device which is sensitive to individual ionizing particles. The resulting flow of charge, in discharge devices of this character, except for the so-called proportional counter, is practically independent of the number of ions formed by the original ionizing particle. Thus, in most G.M. counters each particle, whether it be an alpha or beta particle or gamma ray, gives rise to pulses of nearly the same size, and each is usually registered as one particle. These counters have now reached a practical state of high development as a means of studying feeble radiations such as those found in cosmic rays and from artificial radioactivity which, for example, may be induced or be present in well bores.

Briefly, the action of a G.M. counter may be described as follows. The electric field immediately around the central wire is high enough so that, at the pressure of the gas used, any ion entering the space builds up, by collision, a large number of ions, which in turn build up more ions until the quantity of the charge which finally flows between the inner and outer conductors reaches, for example, the order of $10^{-8}$ coulombs depending, of course, among other quantities, upon the applied potential and until a large ion sheath has developed around the central wire. This charge collecting on the distributed capacity counter causes the potential across the counter to drop to a point at which the discharge can no longer be maintained, and the charge leaks off across an external resistance. The circuit then returns to its normal sensitive condition and is ready for a second count, and, during this time, the charge which builds up on the capacity causes a drop in potential across the external resistance in the form of a Geiger pulse which is read by a suitable high input impedance device. In other words, the process of accumulative ionization continues until the potential difference between the cylinder and the wire has dropped to a point where ionization by collision can no longer occur. The potential recovers itself according to the time constant RC of the circuit, C being usually the distributed capacity as well as the capacity of the coupling condenser and R being the value of the external resistance.

A conventional circuit for measuring the number of counts usually involves coupling the external resistance to various kinds of pulse-sensitive circuits for operating a recorder. This measuring technique requires the use of a voltage source for the G.M. counter which has a constant voltage output during the ionization process, i.e. during the formation of the Geiger pulse, otherwise the pulse which is indicated or recorded may not be truly representative of the current flow through the gas tube. Apart from its voltage stability, this high voltage source in radioactivity well logging operations is required to be

2 of small physical size and rugged enough to withstand the acceleration of a perforator. Further, other problems involved are that the power supply be energized through a single conductor extending through the well bore and that such conductor carry also the resulting Geiger pulses to the surface above the well bore.

It is therefore an object of the present invention to provide improved means and techniques whereby the above-indicated results are achieved.

Another object of the present invention is to provide an improved radioactivity well logging system in which a simple high-voltage power supply for a Geiger counter is incorporated for meeting the problems indicated above.

Another object of the present invention is to provide an improved rectifier power supply for use in a well bore with a Geiger counter.

Another object of the present invention is to provide an improved power supply for a Geiger counter having the advantage that there is a common terminal between the supply and the output so that they may be grounded simultaneously.

Another object of the present invention is to provide an improved Geiger counter arrangement in which a single transformer operates as a step-up transformer for the rectifier power supply and serves also as a step-down transformer to match the impedance of the Geiger tube to a single conductor cable.

Another object of the present invention is to provide a voltage-multiplying rectifier circuit for and operating in conjunction with a Geiger tube and arranged such that the D.C. voltage applied to the Geiger tube is rendered free of disturbances otherwise due to high frequency harmonics.

Another object of the present invention is to provide an improved voltage-multiplying type rectifier circuit for a Geiger tube with the sections of the multiplying circuit so cascaded that the number of sections is related to the impedance of a cable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates apparatus embodying features of the present invention used in radio-activity well logging.

FIGURE 2 is a schematic representation of apparatus illustrated in FIGURE 1.

FIGURE 3 illustrates one of the three cascaded voltage doubling and rectifying sections shown in FIGURE 2.

FIGURE 4 illustrates the character of the Geiger pulse developed in FIGURE 2.

The Geiger tube 10, of conventional construction, includes a central wire 11 and a metal drum 12 forming a cathode. The anode 11 is connected through the high resistance 13 to the positive terminal of the VR tube 14, the other terminal of tube 14 and the drum 12 being grounded so that a voltage drop appears across the resistance 13 representative of the current flowing through the Geiger tube when the same is ionized by an ionizing particle. The voltage pulse thus developed on the anode 11, of the character illustrated in FIGURE 4, is transferred to the surface equipment through the circuit which includes the coupling condenser 15, the secondary winding 16 of transformer 17, the primary winding 18 of such transformer 17, the inner conductor 19 of a single conductor cable 20 and recording means 21 at the surface comprising, for example, an amplifier, multivibrator, integrating circuit and recorder, in that order, with respect to the incoming pulse over conductor 19.

This transformer 17 serves also an additional important function, namely as a step-up transformer for the A.C. voltage supplied from the power supply 22 and which is stepped up in transformer 17 and then applied to the rectifier circuit 24 for developing the D.C. Geiger tube supply voltage appearing across the VR tube 14. For this latter purpose, the ungrounded terminal of the 28-volt A.C. power supply 22 is connected to the primary winding of transformer 17 through the choke coil 26, conductor 19, and one terminal of the winding 18, the other terminal of winding 18 being connected to the cable sheath 28 which, of course, is grounded. The choke coil 26 serves to prevent the Geiger pulse from entering the supply 22.

The secondary winding 16 has one of its terminals grounded to the sheath 28 and the other one of the terminals coupled to the central wire 11 through condenser 15 as previously indicated. Such terminal of winding 16 is also connected to the three-section cascade voltage-multiplying rectifier circuit 24 through the choke coil 30 which prevents the Geiger pulse from entering the rectifier circuit.

A typical one of the three voltage-multiplying sections is illustrated in FIGURE 3 and, as shown in FIGURE 3, includes an input condenser 32 having one of its terminals connected to the junction point of two oppositely-poled rectifier elements 34 and 36 which preferably are of the silicon type. A D.C. voltage is developed across the condenser 38 which has its terminals connected to opposite terminals of rectifiers 34 and 36. It will be seen that an alternating current voltage applied to the condenser 32 and represented by $E \sin \omega t$ develops a D.C. voltage across the condenser 38 having a value of approximately two times E, i.e. twice the peak value of the applied voltage.

The operation of the voltage multiplier circuit in FIGURE 3 may be briefly described as follows. Considering the rectifier 36 to be absent, then condenser 38 will charge to the peak supply voltage E and the potential at the junction point of condenser 32 and rectifier 34 will fluctuate between zero and twice the supply voltage.

Considering now the rectifier 36 to be connected as shown in FIGURE 3, the voltage between the point 39 and the lead 40 will tend to charge the condenser 38 to the peak voltage existing at point 39, thereby giving the possibility of twice the peak supply voltage being obtained across condenser 38 as indicated in FIGURE 3. Such a cascading arrangement has been tripled in FIGURE 2 by adding the sections 42 and 43.

The second section 42 comprises input condenser 32A (corresponding to condenser 32), rectifiers 36A and 34A (corresponding to rectifiers 36 and 34) and output condenser 38A (corresponding to condenser 38); similarly, the third section 43 comprises input condenser 32B (corresponding to condenser 32), rectifiers 36B and 34B (corresponding respectively to rectifiers 36 and 34) and output condenser 38B (corresponding to the condenser 38). The three condensers 38, 38A and 38B are serially connected between the grounded point 40 and the high voltage lead 46 to develop an output of voltage on lead 46 which is approximately 3 times 2E or 6E. It will be noted that, for these purposes, condenser 32 is connected to the junction point 39 and the corresponding condenser 32A is connected to the junction point 39A between rectifiers 36A and 34A. Likewise, the condenser 32B is connected between the junction points 39A and 39B between rectifiers 36B and 34B.

This rectified voltage appearing on the lead 46 is applied to the VR tube 14 through the voltage-dropping resistance 48 to thereby develop a regulated voltage across the VR tube 14 which serves as the voltage source for the G.M. tube 10 as previously indicated. Circuit elements in FIGURE 3 may, for example, have the following values. The choke coils 26 and 30 may be 5 and 30 millihenries respectively. The coupling condenser 15 may have a value of .004 microfarad. The resistances 13 and 48 may have values of 20 and 5.5 megohms respectively. Each one of the condensers forming a part of the rectifier 24 may have a value of one-tenth microfarad and be rated at 600 volts. The rectifiers or diodes may be of the type 1N303a with a sufficient number of the same connected in series to come within voltage ratings. The VR tube 14 may be of the Raytheon type 1038 and supplies a regulated D.C. voltage within the range of 800 to 850 volts.

As mentioned previously, the transformer 17 serves as a step-down transformer to match the impedance of the Geiger tube to the cable 20. This is established by the ratio of the number of turns comprising the primary winding to the number of turns comprising the secondary winding of transformer 17. At the same time, this turns ratio establishes the ratio at which the voltage of source 22 is stepped up before application to the rectifier 24. One advantage of using a plurality of sections 38, 42 and 43 in the rectifier 24 is that the number of sections used may be chosen so as to provide the desired multiplication in voltage which is required by the Geiger tube 10 with due consideration given to the turns ratio of transformer 17 in effecting its dual functions described previously. In other words, the use of a plural section and a cascaded voltage doubling circuit allows flexibility in design of a Geiger counter system wherein a specified voltage is required to be supplied to the Geiger tube and the resulting Geiger pulses are required to be supplied over a long impedance-matched line.

Stated in other words, the use of a plural section rectifier as taught herein has the advantage that a transformer 17 may be used such that it provides not only proper impedance matching for pulse transmission, but also serves to establish the correct operating voltage for the Geiger tube which develops such pulses.

Other advantages of the rectifier system, besides its flexibility, is that the same may be made small and rugged compatible with conditions in a well bore wherein large shock and acceleration forces are encountered.

Another advantage of the particular cascade voltage multiplying and rectifying circuit described herein is that there is a common terminal, i.e. the grounded terminal between the supply and the output, so that both may be grounded simultaneously. This, of course, results in simplicity and accuracy, considering particularly the fact that relatively small currents are developed in the Geiger tube or proportional counter, as the case may be.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a radioactivity well logging system in which an ionization device and its rectifier supply source in a well bore are connected through a cable to a low voltage A.C. power supply and indicating means located on the surface above the well bore, the improvement which resides in coupling said indicating means and said power supply to said ionization device and said supply source through said cable and a transformer which serves as a step-up transformer between said power supply and said supply source and which serves also as a step-down transformer impedance matching means for matching the impedance of said ionization device to said cable and indicating means.

2. In a radioactivity well logging system in which an ionization device and its rectifier supply source in a well bore are connected through a cable to a low voltage A.C. power supply and indicating means located on the surface above the well bore, the combination comprising a transformer coupling said cable to said ionization device and providing a transformer impedance match for the same, a multiple section voltage-multiplying and rectifier circuit comprising said supply source having high voltage output terminals thereof connected to said device to supply current to the same, said transformer serving to couple said power supply to the input of said rectifier circuit.

3. An arrangement as set forth in claim 2 in which said rectifier circuit has a grounded input terminal and a grounded output terminal.

4. In radioactivity logging apparatus the combination of, a pulse type radioactivity detector, a step-up transformer, a secondary of said transformer connected to said radioactivity detector, a primary of said transformer connected to one end of a logging cable, an indicator means connected to a second end of said logging cable for indicating the pulses from said radioactivity detector, a low alternating current voltage source connected to said second end of said cable, said transformer being provided by step-down transformer action to match the impedance of said radioactivity detector to said cable and said indicating means and to provide by step-up transformer action an intermediate alternating current voltage in response to said low voltage source, a multiple-section rectifier type voltage multiplier for providing high direct current voltage when supplied with an intermediate voltage in connection with said secondary and in connection with said radioactivity detector, and a high voltage direct current regulator in connection with said voltage multiplier for stabilizing said direct current voltage.

5. The apparatus of claim 4 wherein a conductor of said logging cable is connected as a common voltage return.

6. In radioactivity logging apparatus the combination of a pulse type radioactivity detector, a step-up transformer, a secondary of said transformer connected to said radioactivity detector, a primary of said transformer connected to one end of a logging cable, an indicator means connected to a second end of said logging cable for indicating pulses from said radioactivity detector, a low alternating current voltage source connected to said second end of said cable, said transformer being provided to match the impedance of said radioactivity detector to said cable and said indicating means and to provide an intermediate alternating current voltage in response to said low voltage source, and means for providing high direct current voltage when supplied with an intermediate voltage including a multiple section rectifier type voltage multiplier connected with said secondary and connected with said radioactivity detector.

7. The apparatus of claim 6 wherein the input of said means for direct current voltage is grounded through said secondary and its output is commonly grounded through a voltage regulating means.

8. The apparatus of claim 6 wherein a capacitor is connected between said detector and said secondary and a high value resistor is connected between said detector and said means for producing direct current voltage.

References Cited in the file of this patent

UNITED STATES PATENTS

| | | |
|---|---|---|
| 2,361,274 | Cravath | Oct. 24, 1944 |
| 2,368,532 | Fearon | Jan. 30, 1945 |
| 2,369,550 | Frosch | Feb. 13, 1945 |
| 2,628,338 | Gould | Feb. 10, 1953 |
| 2,675,484 | Hepp | Apr. 13, 1954 |
| 2,740,052 | Castel et al. | Mar. 27, 1956 |